Patented Feb. 15, 1938

2,108,570

UNITED STATES PATENT OFFICE 2,108,570

KINDS OF WATER AND METHODS OF PRODUCING THEM

Edward W. Washburn, Washington, D. C.; L. Russell Alden, executor of said Edward W. Washburn, deceased, assignor to American Security and Trust Company, Trustee, Washington, D. C., a corporation of District of Columbia No Drawing. Application June 27, 1933, Serial No. 677,956

4 Claims. (Cl. 204—9)

This invention pertains to the art of isotopic concentration and more particularly to the isotopes of hydrogen and oxygen, so that their proportions may be varied to produce pure water of different densities, or they may be chemically combined individually or collectively in such manner as to form various useful chemical compounds.

It is known that the element oxygen consists of three isotopes of different masses, namely $O^{16}$, $O^{17}$ and $O^{18}$, and that the element hydrogen consists of two isotopes of different masses, namely $H^1$ and $H^2$. It therefore follows that ordinary water contains these different isotopes, and that density, and other properties of water will depend upon its isotopic composition. In view of this, it is possible to produce water which is lighter or heavier, respectively, than normal water, by a method of changing its isotopic composition.

One of the objects of the present invention is to accomplish the above mentioned result and to produce waters of different isotopic composition, some of which are lighter and others of which are heavier than the normal water of nature. The term "normal water of nature", as used in this application, is intended to mean solely the chemical substance represented by the formula $H_2O$, and consisting of the elements oxygen and hydrogen chemically combined in the ratio of two atoms of hydrogen to one atom of oxygen. A further object is to obtain complete fractionation of the isotopes of hydrogen and oxygen as contained in water, so as to make available for recombination with one another or with other substances the respective pure isotopes of hydrogen and oxygen.

The invention will be hereinafter fully set forth and particularly pointed out in the claims.

In a preferred method of practicing the invention a sample of water is first made electrically conducting by dissolving therein a suitable electrolyte. Any one of a considerable number of electrolytes may be employed for this purpose, the principal condition being that during the passage of an electric current through the solution the water shall undergo an electrolytic decomposition with the production of hydrogen at the cathode and/or the production of oxygen at the anode. The solution prepared as above is subjected to electrolysis between electrodes of such nature that hydrogen is evolved at the cathode and/or oxygen is evolved at the anode. For purpose of illustration, the normal pure water may be acidified with sulphuric acid and electrolyzed between platinum electrodes. This example is given without intending to limit the invention, because obviously it may be modified without departing from the spirit of the invention.

During the decomposition stage, if hydrogen is evolved at the cathode, an isotopic fractionation of the hydrogen takes place in the sense that the evolved hydrogen contains a smaller proportion of the heavier isotope ($H^2$) than does the hydrogen in the water from which it is evolved. At the same time the proportion of the heavier isotope ($H^2$) in the residual water increases as the electrolysis proceeds. With this increase in the heavier isotope ($H^2$) in the residual water, there is associated a rise in the density of this water, and likewise a rise in its freezing point and its boiling point, and a decrease in its refractive index. As the electrolysis proceeds the density of the residual water rises continually until the isotopic composition of the water (as regards hydrogen) approaches close to or attains that corresponding to the formula $$H_2^2O$$

Furthermore, if the electrolysis is conducted in such a way that oxygen is evolved at the anode, an isotopic fractionation of the oxygen also takes place, the evolved oxygen having a larger proportion of the lighter isotope, (or isotopes) than does the water from which it is evolved. At the same time, the proportions of the heavier isotope (or isotopes) of oxygen in the residual water increase. As the electrolysis proceeds the isotopic fractionation of the oxygen continues until a point is finally reached at which the fractionation may cease or become very slow. Thus, the density of the water is increased and a desired predetermined density may be obtained by arresting the electrolysis at the stage of the desired density.

In addition to the above method of preparing heavy water containing increased amounts of the heavier isotopes of hydrogen and oxygen, it is also possible to prepare a light water. That is, a water which is less dense than the normal water of nature. To accomplish this, the oxygen and the hydrogen isotopes, which are evolved during the electrolysis of the normal pure water are caused to recombine, or are separately combined, (the hydrogen with normal hydrogen and the oxygen with normal oxygen) so as to again produce water. This water is lighter than normal water, and if it is now partially re-electrolyzed and the gases again combined as above indicated, so as to produce water again, a further drop in density occurs. By continuing this process of producing water, by recombining the gases which are evolved during the first part of the electrolysis and re-electrolyzing the water so produced, so as to yield another sample by the recombination of the gases evolved during the first part of the electrolysis, and successively continuing these stages, samples of water of successively low densities will be obtained, the limiting density in this direction being that for a water having an isotopic composition represented by the formula $$H_2^1 O^{16}$$

It is evident that once having produced samples of water of different isotopic composition, the decomposition of such a sample into its elements will yield hydrogen and oxygen having the corresponding isotopic composition. Thus, pure $H^1$ and pure $O^{16}$ may be produced by decomposing a sample of water having the composition $$H_2^1 O^{16}$$

and pure $H^2$ may be produced by decomposing a sample of water having the composition $$H_2^2 O$$

The advantages of the invention will be readily understood by those skilled in the art to which it belongs. For instance, it is possible to obtain pure water of different densities and varying proportions of the respective isotope masses and in controlled ratio. Another obvious advantage is that the availability in pure form of the heavy isotope of hydrogen will be of great utility. The full extent of the utility of this material is not known at the present time, but it has been recognized that by reason of its existence it is possible to make a large number of new and useful chemical compounds containing this new kind of hydrogen.

Having thus explained the nature of the invention and described an operative manner of constructing and using the same, although without attempting to set forth all of the forms in which it may be made, or all of the forms of its use, what is claimed is:—

1. The method of altering the density of normal water consisting of decomposing the water by electrolysis so as to evolve oxygen at the anode and hydrogen at the cathode, and arresting such decomposition when the isotopic composition of the residual water approximates the formula $$H_2^2 O$$

2. The method of obtaining isotopic concentration comprising artificially producing water having an isotopic concentration corresponding to the formula $$H_2^2 O$$

decomposing the artificially produced water by electrolysis and thereby liberating pure $H^2$ isotope and collecting the last mentioned isotope as it is liberated.

3. The method of obtaining isotopic concentration comprising artificially producing a water having an isotopic concentration corresponding to the formula $$H_2^1 O^{16}$$

partially decomposing said artificially produced water by electrolysis and thereby separately liberating hydrogen and oxygen gases, recombining the liberated gases with each other to produce a new water, and decomposing the water of said recombination by re-electrolysis, and alternately continuing the recombining of the gases and the re-electrolysis of the resultant waters until the density of the final water ceases to decrease with continuation of the process.

4. The method of obtaining isotopic concentration of normal water comprising artificially producing water which corresponds to the approximate formula of $$H_2^1 O^{16}$$

decomposing said artificially produced water by electrolysis so as to separately liberate hydrogen and oxygen gases, and continuing the decomposing stage until the liberated hydrogen consists of the pure $H^1$ isotope and the liberated oxygen consists of the pure $O^{16}$ isotope.

EDWARD W. WASHBURN.